(12) United States Patent
Yasumura et al.

(10) Patent No.: US 8,850,282 B2
(45) Date of Patent: Sep. 30, 2014

(54) VERIFYING DEVICE, IMAGING DEVICE HAVING VERIFYING FUNCTION, AND VERIFYING METHOD

(71) Applicant: Panasonic Corporation, Osaka (JP)

(72) Inventors: Kengo Yasumura, Osaka (JP); Naoki Fujimoto, Osaka (JP); Hiroyuki Awano, Osaka (JP); Yasuhiro Sasano, Osaka (JP)

(73) Assignee: Panasonic Corporation, Osaka (JP)

( * ) Notice: Subject to any disclaimer, the term of this patent is extended or adjusted under 35 U.S.C. 154(b) by 145 days.

(21) Appl. No.: 13/673,053

(22) Filed: Nov. 9, 2012

(65) Prior Publication Data

US 2013/0121124 A1 May 16, 2013

(30) Foreign Application Priority Data

Nov. 14, 2011 (JP) .................................. 2011-248333

(51) Int. Cl.
*G01R 31/28* (2006.01)
*G11B 20/18* (2006.01)
*G11B 20/10* (2006.01)

(52) U.S. Cl.
CPC .. *G11B 20/1816* (2013.01); *G11B 2020/10537* (2013.01); *G11B 2220/2537* (2013.01)
USPC ............................................. 714/733; 714/54

(58) Field of Classification Search
CPC ................. G11B 20/1816; G11B 2020/10537; G11B 2020/2537
USPC ........... 365/9, 10; 369/53.15, 53.23; 713/189; 714/42, 733, 54
See application file for complete search history.

(56) References Cited

U.S. PATENT DOCUMENTS

| | | | |
|---|---|---|---|
| 6,490,236 B1 | 12/2002 | Fukuda et al. | |
| 7,808,870 B2 * | 10/2010 | Takahashi et al. | 369/53.23 |
| 8,631,281 B1 * | 1/2014 | Stripling et al. | 714/42 |
| 8,667,302 B2 * | 3/2014 | Yoshioka et al. | 713/189 |
| 2006/0013095 A1 * | 1/2006 | Liu et al. | 369/53.15 |
| 2006/0156180 A1 | 7/2006 | Kang | |
| 2007/0091322 A1 * | 4/2007 | Tano | 356/610 |
| 2007/0153412 A1 * | 7/2007 | Takeda et al. | 360/69 |

FOREIGN PATENT DOCUMENTS

| | | |
|---|---|---|
| JP | 6-291682 | 10/1994 |
| JP | 2001-291344 | 10/2001 |
| JP | 2006-164503 | 6/2006 |

\* cited by examiner

*Primary Examiner* — David Ton
(74) *Attorney, Agent, or Firm* — Wenderoth, Lind & Ponack, L.L.P.

(57) ABSTRACT

A verifying device includes a receiving unit operable to receive data recorded on a recording medium and a verifying unit operable to verify the received data. The verifying unit sets a predetermined first range and a second range that includes a plurality of the first ranges on the received data, performs first verification about an error on data included in the first range out of the received data, performs second verification about an error on data included in the second range out of the received data on the basis of a result of the first verification, and determines whether the recorded data is successfully recorded on the recording medium on the basis of the results of the first and second verification.

10 Claims, 4 Drawing Sheets

VERIFYING DEVICE, IMAGING DEVICE HAVING VERIFYING FUNCTION, AND VERIFYING METHOD

BACKGROUND

1. Technical Field

The present disclosure relates to a verifying device operable to verify a recording state of data recorded on a recording medium.

2. Related Art

JP 2006-164503 A discloses an optical disk recording device which processes data included in a defect region on an optical disk.

SUMMARY

When an optical disk which has failed to be successfully recorded a moving image stream is reproduced, a problem may occur in that a noise is generated at a portion where data is unsuccessfully recorded and the moving image cannot be reproduced.

The present disclosure discloses a verifying device operable to verify whether data is successfully recorded on a recording medium.

The verifying device according to the present disclosure includes a receiving unit operable to receive data recorded on a recording medium and a verifying unit operable to verify the received data. The verifying unit sets a predetermined first range and a second range that includes a plurality of the first ranges on the received data, performs first verification about an error on data included in the first range out of the received data, performs second verification about an error on data included in the second range out of the received data on the basis of a result of the first verification, and determines whether the recorded data is successfully recorded on the recording medium on the basis of the results of the first and second verification.

The imaging device according to the present disclosure is an imaging device operable to connect to a recording device that records data on a recording medium. The imaging device includes an imaging unit operable to generate data from a subject image, a transmitting unit operable to transmit the generated data to the recording device so that the recording device records the generated data on the recording medium, a receiving unit operable to receive data recorded by the recording device on the recording medium, and a verifying unit operable to verify the received data. The verifying unit sets a predetermined first range and a second range that includes a plurality of the first ranges on the received data, performs first verification about an error on data included in the first range out of the received data, performs second verification about an error on data included in the second range out of the received data on the basis of a result of the first verification, and determines whether the recorded data is successfully recorded on the recording medium on the basis of the results of the first and second verification.

The verifying method according to the present disclosure includes receiving data recorded on a recording medium, setting a predetermined first range and a second range that includes a plurality of the first ranges on the received data, performing first verification about an error on data included in the first range out of the received data, performing second verification about an error on data included in the second range out of the received data on the basis of a result of the first verification, and determining whether the recorded data is successfully recorded on the recording medium on the basis of the results of the first and second verification.

The verifying device, the imaging device, or the verifying method according to the present disclosure enables the verification on whether data is successfully recorded on a recording medium.

DETAILED DESCRIPTION OF PREFERRED EMBODIMENTS

Embodiments will be described below with reference to the attached drawings. A video camera having a verifying device will be exemplified as the embodiments.

In the description of the disclosure, certain unnecessary portions regarding, for example, conventional technology, redundant description on substantially the same configuration may be omitted for ease of description.

The description of the disclosure and the attached drawings are disclosed to enable those skilled in the art to sufficiently understand the present disclosure, but are not intended to limit the subject matter of the claims.

1. Configuration of Present Embodiment

Figure 1:
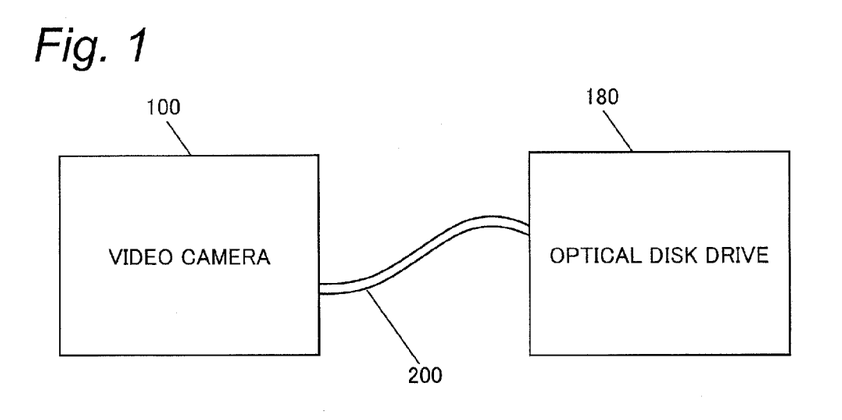
FIG. 1 is a diagram illustrating a connection between a video camera and an optical disk drive according to an embodiment.

FIG. 1 is a diagram illustrating a connection between a video camera and an optical disk drive according to the present embodiment. As illustrated in FIG. 1, a video camera 100 according to the present embodiment is connected to an optical disk drive 180 via a USB cable 200. Image data captured and held by the video camera 100 can be transmitted to and recorded in the optical disk drive 180 through the USB cable 200.

1-1. Configuration of Video Camera

Figure 2:
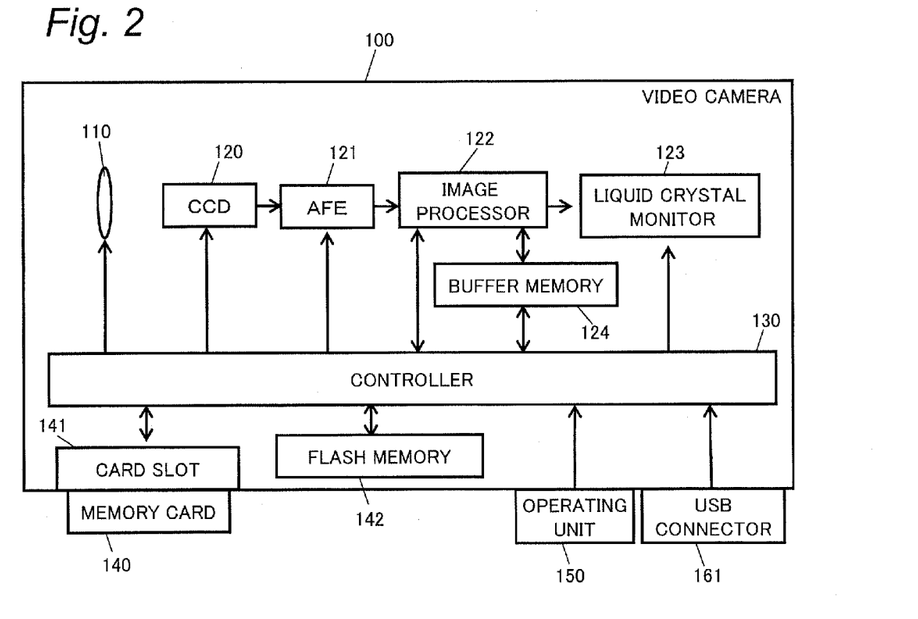
FIG. 2 is a block diagram illustrating an electric configuration of the video camera according to the present embodiment.

FIG. 2 is a block diagram illustrating a configuration of the video camera 100 according to the present embodiment. The video camera 100 is a digital video camera. The video camera 100 has an optical system 110, a CCD image sensor 120, an Analog Front End (AFE) 121, an image processor 122, a liquid crystal monitor 123, a buffer memory 124, a controller 130, a card slot 141 to which a memory card 140 can be mounted, a flash memory 142, an operating unit 150, and a USB connector 161.

The video camera 100 captures a subject image formed through the optical system 110 with the CCD image sensor 120. The CCD image sensor 120 generates image information based on the captured subject image. The generated image information is subject to various processes in the AFE (Analog Front End) 121 and the image processing unit 122. The image information which has undergone the processing is recorded in the flash memory 142 and/or the memory card 140. The image information recorded in the flash memory 142 and/or the memory card 140 is displayed on the liquid crystal monitor 123 in response to a user's operation received by the operating unit 150.

The optical system 110 includes a focus lens, a zoom lens, a diaphragm, a shutter, and so on. It is noted that the each lens included in the optical system 110 may be composed of one lens or a plurality of lenses. The each lens may also be composed of a group of lenses or a plurality of groups of lenses.

The CCD image sensor 120 captures the subject image formed through the optical system 110 to generate image information. Light from the subject to be captured passes through the optical system 110, is then formed on a light receiving surface of the CCD image sensor 120, and converted into an electric signal indicating the image information. The converted electric signal is output to the AFE 121 at the output stage of the CCD image sensor 120.

Further, the CCD image sensor 120 operates depending on several drive modes corresponding to the operation modes of the video camera 100. The operation modes of the video camera 100 include a still image recording mode, a moving image recording mode, a through image capturing mode, and other modes.

The AFE 121 performs noise suppression by means of correlated double sampling, gain multiplication based on the ISO speed value by means of an analog gain controller, and A/D conversion by means of an A/D converter on the image information output from the CCD image sensor 120. Then, the AFE 121 outputs the image information to the image processor 122.

The image processor 122 performs various processes on the image information output from the AFE 121. The various processes include, but not limited to, white balance correction, gamma correction, YC conversion process, electronic zoom process, compression process, decompression process, and so on. The image processor 122 may be implemented with a hard-wired electronic circuit, a microcomputer with a program, or the like. Further, the image processor 122 may be implemented as one semiconductor chip integrally with the controller 130 and the like.

The liquid crystal monitor 123 is installed on the rear surface of the video camera 100. The liquid crystal monitor 123 displays an image based on the image information processed by the image processor 122.

The controller 130 controls an entire operation of the video camera 100. The controller 130 may be implemented with a hard-wired electronic circuit, a microcomputer, or the like. Further, the controller 130 may be implemented as one semiconductor chip integrally with the image processor 122 and the like.

Upon the moving image recording operation, the controller 130 sets the operation mode of the CCD image sensor 120 and the image processor 122 to the moving image recording mode. In the moving image recording mode, the CCD image sensor 120 outputs images of a full high vision size (1920 dots×1080 dots) at the rate of 60 frames per second in the progressive method for example. Then, the image processor 122 performs the compression process on the image output from the CCD image sensor 120.

The flash memory 142 is an internal memory for recording the image information and the like. Also, the flash memory 142 stores a program for controlling over the entire operation of the video camera 100.

The buffer memory 124 is storage means used as a working memory for the image processor 122 and the controller 130.

The buffer memory 124 may be implemented with a DRAM (Dynamic Random Access Memory) or the like.

The card slot 141 is connecting means to which the memory card 140 can be mounted. The card slot 141 can electrically and mechanically connect with the memory card 140. Further, The card slot 141 may have a function for controlling the memory card 140.

The memory card 140 is an external memory that incorporates a recording unit such as a flash memory. The memory card 140 can record data such as the image information to be processed in the image processor 122.

The operating unit 150 includes operation buttons and control levers provided on a casing of the video camera 100, and receives a user's operation. The operating unit 150 includes a moving image recording button and the like (not shown). The moving image recording button is a push-type button.

In a capture standby state of the moving image recording mode, the video camera 100 displays a through image on the liquid crystal monitor 123. When a moving image recording button 206 is pressed in the capture standby state, the controller 130 starts a moving image recording operation. When the moving image recording operation is started, the CCD image sensor 120 and the image processing unit 122 generate moving image information in the moving image recording mode. At this time, a microphone (not shown) picks up sounds to generate sound information. Then, the image processor 122 multiplexes the generated moving image information and the sound information in accordance with a predetermined moving image recording format to generate moving image information with sound.

The controller 130 records the generated moving image information with sound into the memory card 140. When the video camera 100 is in a moving image recording state and the moving image recording button 206 is pressed down, the controller 130 finishes the moving image recording operation.

The USB connector 161 is a connector in conformity with USB. With the USB connector 161, the video camera 100 can be electrically connected to other electric device having a USE connector via a USB cable. With the USB connector 161, the video camera 100 according to the present embodiment is connected to a USB connector 183 of the optical disk drive 180 via the USB cable 200.

1-2. Configuration of Optical Disk Drive

Figure 3:
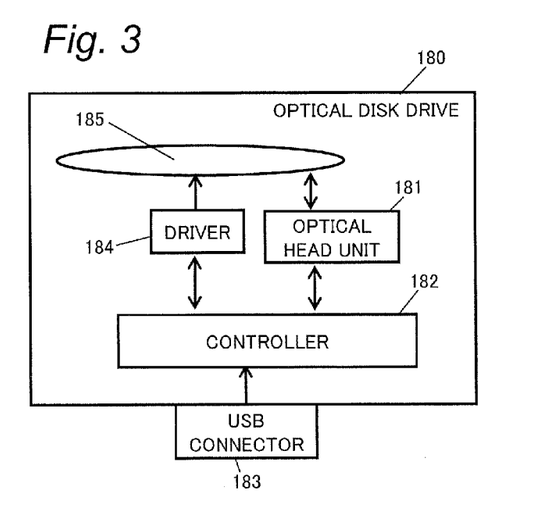
FIG. 3 is a block diagram illustrating an electric configuration of the optical disk drive according to the present embodiment.

FIG. 3 is a block diagram illustrating a configuration of the optical disk drive 180 according to the present embodiment. The optical disk drive 180 has an optical head unit 181, a controller 182, a USB connector 183, a driver 184, and an optical disk 185.

The controller 182 controls operations of the respective units of the optical disk drive 180. The controller 182 may be implemented to a hard-wired electronic circuit, a microcomputer, or the like.

The optical disk 185 is a recording medium capable of recording and reproducing information by using of light irradiation. The optical disk 185 is a DVD disc or a Blu-ray disc, for example.

The driver 184 turns around the optical disk 185 according to a control signal from the controller 182.

The optical head unit 181 can write the information obtained from the controller 182 as a recording target onto the optical disk 185 or read out the information written on the optical disk 185 to transfer the read information to the controller 182, according to a control signal from the controller 182.

The USB connector 183 is a connector in conformity with USB. With the USB connector 183, the optical disk drive 180 can be electrically connected to other device having a USB connector via a USB cable.

With the USB connector 183, the optical disk drive 180 according to the present embodiment is connected to the USB connector 161 of the video camera 100 via a USB cable. The optical disk drive 180 can transfer the information read out from the optical disk 185 by the optical head unit 181 to the controller 130 of the video camera 100 via the USB connectors 183 and 161. Also, the optical disk drive 180 can obtain the information recorded on the memory card 140 of the video camera 100 via the USB connectors 183 and 161.

2. Operation of Video Camera 2-1. Copying Operation of Video Camera

When receiving user's pressing on a moving image recording start button in the capture standby state, the video camera 100 starts the moving image recording operation to record the moving image stream generated by the CCD image sensor 120, the image processor 122, and the like onto the memory card 140. When the moving image recording start button is pressed again by the user during the moving image recording operation, the controller 130 of the video camera 100 stops the moving image recording operation. When the moving image recording operation is stopped, a series of generated moving image stream is recorded on the memory card 140.

The user of the video camera 100 can choose a mode for reproducing the moving image stream recorded on the memory card 140 by operating the operating unit 150. At this time, the user can copy the moving image stream recorded on the memory card 140 to other recording device by connecting the video camera 100 to the other recording device.

In the present embodiment, the video camera 100 is connected to the optical disk drive 180 as a recording device via the USB connectors 161, 183 and the USB cable 200. The operation of the video camera 100 performed when the moving image stream recorded on the memory card 140 of the video camera 100 is copied (recorded) to the optical disk drive 180 will be described below.

When detecting that the video camera 100 is connected to the optical disk drive 180 via the USB cable 200, the controller 130 displays a inquiry screen on the liquid crystal monitor 123. The inquiry screen is a screen for the user to choose either one of copying of the moving image stream recorded on the memory card 140 to the optical disk 185 and reproducing of the moving image stream recorded on the optical disk 185 on the liquid crystal monitor 123. When the user chooses the copying of the moving image stream recorded on the memory card 140 to the optical disk 185 by operating the operating unit 150, the controller 130 displays a screen for the user to choose either one of "all data copy" and "selected data copy" on the liquid crystal monitor 123.

If the user chooses "all data copy", the controller 130 copies all the moving image data recorded on the memory card 140 to the optical disk 185. On the other hand, if the user selects "selected data copy", the controller 130 copies part of the moving image stream recorded on the memory card 140 to the optical disk 185. Specifically, the controller 130 displays a thumbnail list of the representative images of the moving image data recorded on the memory card 140 on the liquid crystal monitor 123. The user chooses the moving image stream to be copied by operating the operating unit 150 while viewing the thumbnail list displayed on the liquid crystal monitor 123. Then, the selected moving image stream is copied on the optical disk 185.

The video camera 100 according to the present embodiment copies (records) the moving image stream from the memory card 140 to the optical disk 185, and then performs an error verifying operation for checking whether the stream has been successfully recorded. The error verifying operation of the video camera 100 will be described below.

2-2. Error Verifying Operation of Video Camera 2-2-1. About Short Time Range and Long Time Range In the present embodiment, a long time range and a short time range are defined as the ranges for performing the error verifying operation to the moving image stream. Specifically, the short time range is defined as a range including a predetermined number of packets in the moving image stream. The long time range is defined as a range including a predetermined number (four in the present embodiment) of continuous short time ranges.

That is, the controller 130 of the video camera 100 recognizes the length of the short time range by the predetermined number of packets. The controller 130 of the video camera 100 recognizes the four sequential short time ranges as one long time range. The video camera 100 according to the present embodiment performs double-check including error verification for the short time range and error verification for the long time range. Thereby, the video camera 100 can more suitably check whether the data is successfully recorded.

The video camera 100 manages four variables in the flash memory 142. The four variables include an error level count (High), an error level count (Middle), an error level count (Low), and a count of checked short time ranges.

The error level count (High), the error level count (Middle), and the error level count (Low) are variables indicating the count of the short time ranges in a certain long time range, each of which includes a certain count of error packets for the respective degrees of error. In the present embodiment, the error level count (High), the error level count (Middle), and the error level count (Low) are counted up according to the count of error packets included in a certain short time range. Details of counting up the error level counts will be described later. The count of checked short time ranges indicates the count of the short time ranges having been checked out of the short time ranges composing a certain long time range. For example, the count of checked short time ranges "2" indicates that two short time ranges in a certain long time range have been checked for the count of error packets.

2-2-2. About Error Verifying Operation

Figure 4:
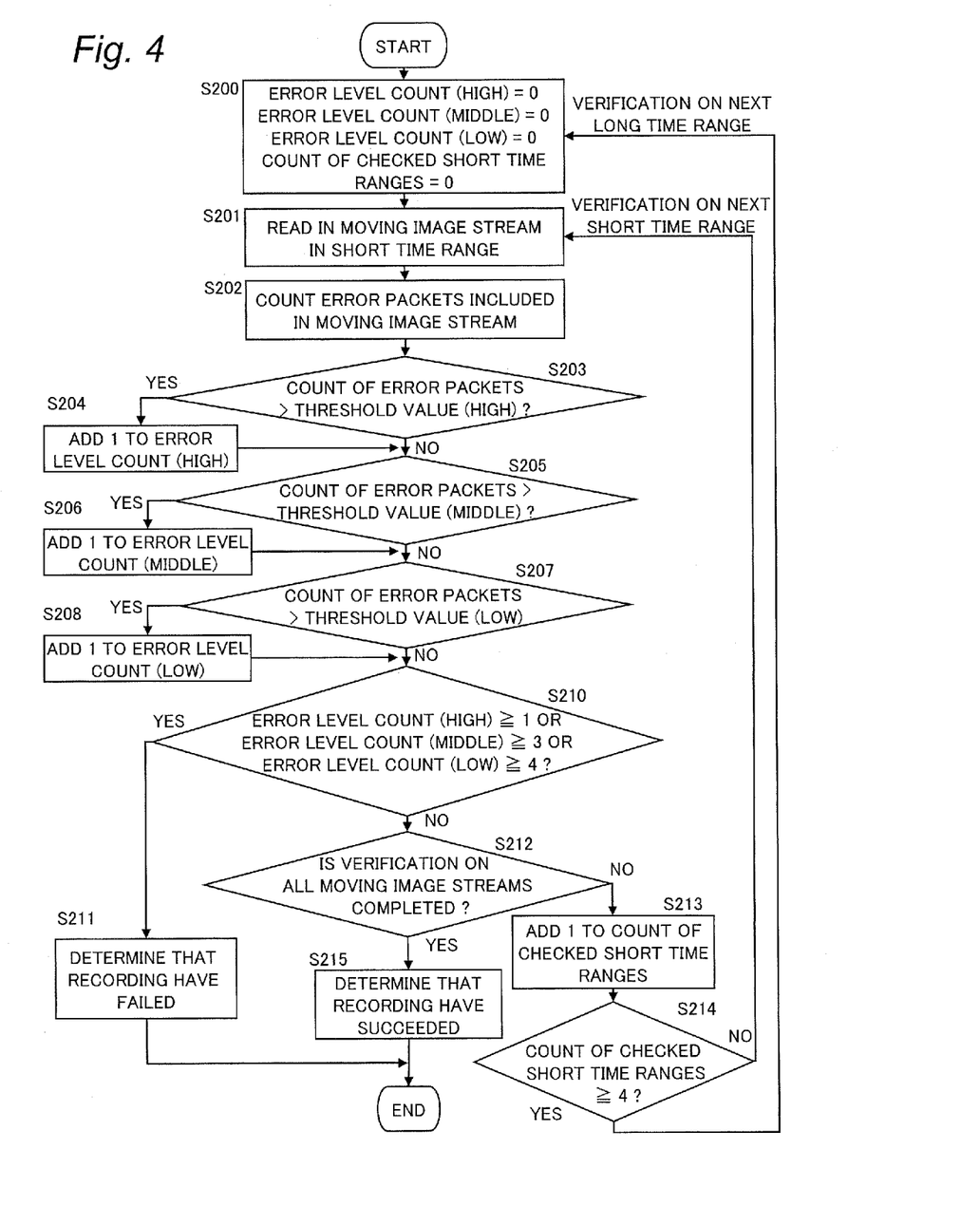
FIG. 4 is a flow chart for describing an error verifying operation of the video camera according to the present embodiment.

The error verifying operation of the video camera 100 performed on the moving image stream (data) recorded on the optical disk drive 180 will be described with reference to FIG. 4.

When the error verifying operation is started, the controller 130 of the video camera 100 resets the values of the four variables managed in the flash memory 142 to zero. That is, the controller 130 resets the respective values of the error level count (High), the error level count (Middle), the error level count (Low), and the count of checked short time ranges to zero (S200).

Subsequently, the controller 130 instructs, via the USB connectors 161 and 183, the controller 182 of the optical disk drive 180 to read in the recorded moving image stream from the optical disk 185 (S201). Herein, the controller 130 of the video camera 100 instructs the controller 182 of the optical disk drive 180 to read the moving image stream having data size corresponding to the number of packets composing the short time range. When receiving the instruction, the controller 182 of the optical disk drive 180 controls the optical head unit 181 to read the moving image stream from the optical disk 185. The moving image stream read out by controlling the optical head unit 181 is recorded in the flash memory 142 of the video camera 100 via the USB connectors 183 and 161.

The controller 130 of the video camera 100 reads out the moving image stream recorded in the flash memory 142 to count the error packets included in the read moving image stream (S202). That is, the controller 130 counts the error packets in the read moving image stream included in the short time range.

Here, each packet composing the moving image stream includes a flag which is set when the moving image is successfully recorded. If the recording of the moving image has failed, the packet does not include the flag.

When detecting the absence of the flag in a packet, The controller 130 determines that the packet is corrupted, and counts the packet as the error packet.

When the controller 130 completes the checking of the flag of all the packets in the moving image stream read out for the short time range, the controller 130 compares the count of error packets with predetermined threshold values (the threshold value (High), the threshold value (Middle), and the threshold value (Low)). The threshold values are preliminarily set so that the threshold value (High) is greater than the threshold value (Middle), and the threshold value (Middle) is greater than the threshold value (Low).

At this time, at first, the controller 130 compares the count of error packets with the threshold value (High) (S203). Herein, the threshold value (High) is a threshold value for determining whether a high degree of error is included in the moving image stream within the short time range. For example, the count of error packets which can be included in the moving image stream within the short time range to disable the moving image stream to be reproduced is preliminarily set to the threshold value (High). If the count of error packets exceeds the threshold value (High) (YES in step S203), the controller 130 adds one to the error level count (High) (S204).

Subsequently, the controller 130 compares the count of error packets with the threshold value (Middle) (S205). Herein, the threshold value (Middle) is a threshold value for determining whether a medium degree of error is included in the moving image stream within the short time range. The threshold value (Middle) is preliminarily set to enable the determination that a noise is produced on the condition that the long time range of the moving image stream includes a plurality of short time ranges, each of which including the error packets by the number corresponding to the medium degree of error. If the count of error packets exceeds the threshold value (Middle) (YES in step S205), the controller 130 adds one to the error level count (Middle) (S206).

Subsequently, the controller 130 compares the count of error packets with the threshold value (Low) (S207). The threshold value (Low) is a threshold value for determining whether a low degree of error is included in the moving image stream within the short time range. The threshold value (Low) is preliminarily set to enable the determination that a noise is produced on the condition that all the short time ranges composing the long time range of the moving image stream include the error packets by the number corresponding to the low degree of error. If the count of error packets exceeds the threshold value (Low) (YES in step S207), the controller 130 adds one to the error level (Low) (S208).

In this manner, the controller 130 performs all of the determination based on the threshold value (High) (S203), the determination based on the threshold value (Middle) (S205), and the determination based on the threshold value (Low) (S207) for the count of error packets. Hence, for example, if the count of error packets exceeds the threshold value (High), one is added to each of the error level (High), the error level (Middle), and the error level (Low).

Subsequently, the controller 130 determines whether the error level count (High), the error level count (Middle), and the error level count (Low) respectively are the corresponding predetermined values or more (S210). Herein, the predetermined values are preliminarily set for the error level count (High), the error level count (Middle), and the error level count (Low), respectively. In the present embodiment, for example, one is set to the predetermined value corresponding to the error level count (High), three is set to the predetermined value corresponding to the error level count (Middle), and four, which is the number of short time ranges composing one long time range, is set to the predetermined value corresponding to the error level count (Low). If any one of the error level count (High), the error level count (Middle), and the error level count (Low) is equal to or greater than the corresponding predetermined value (YES in step S210), the controller 130 determines that the moving image stream has been unsuccessfully recorded on the optical disk 185 (S211). Then, the controller 130 displays information indicating that successful recording has failed on the liquid crystal display 123. From this information, the device or the user can recognize that copying of the moving image stream to the optical disk has failed.

On the other hand, if none of the error level count (High), the error level count (Middle), and the error level count (Low) exceeds the predetermined value (NO in step S210), the controller 130 determines whether the error verifying operation has been completed to the moving image stream, to which the copy from the memory card 140 to the optical disk 185 is instructed (S212). That is, the controller 130 determines whether the verifying operation has been completed to the end of the moving image stream data. However, for example, if the user has instructed to copy the moving image streams corresponding to a plurality of scenes from the memory card 140 to the optical disk 185, the controller 130 determines whether the verifying operation has been completed on the moving image stream for each scene.

If determining that the error verifying operation has been completed to the end of the moving image stream data (YES in step S212), the controller 130 determines that successful recording of the moving image stream to the optical disk 185 has succeeded. In this case, the controller 130 displays information indicating that successful recording has succeeded on the liquid crystal display 123.

On the other hand, if determining that the error verifying operation has not been completed to the end of the moving image stream data (NO in step S212), the controller 130 adds one to the count of checked short time ranges (S213). Then, the controller 130 determines whether the error verifying operation has been performed for all the short time ranges composing the long time range which is currently undergoing the verifying operation (S214). In the present embodiment, since four short time ranges compose one long time range, the controller 130 determines whether the count of checked short time ranges is four or more (S214).

If the count of checked short time ranges is less than four (NO in step S214), other short time range composing the long time range which is currently undergoing the error verifying operation still exists. Thus, the controller 130 starts checking the next short time range. As far as other short time range composing the long time range which is currently undergoing the error verifying operation still exists, the controller 130 repeats the above-described error verifying operation (S201 to S210 and S212 to S214).

On the other hand, if the count of checked short time ranges is four or more (YES in step S214), the controller 130 determines that the verifying operation has been completed for all the short time ranges composing the long time range which is currently undergoing the verifying operation. Then, the controller 130 starts checking the continuous subsequent long time range. At this time, the controller 130 resets the respective values of the error level count (High), the error level count (Middle), the error level count (Low), and the count of checked short time ranges to zero (S200). Thereafter, the controller 130 repeats the above-described error verifying operation (S201 to S210 and S212 to S214) until it is determined that any one of the three error levels is equal to or greater than the responding predetermined value (YES in step S210) or until it is determined that the verifying operation has been performed to the end of the moving image stream data (YES in step S212).

As described above, the video camera 100 according to the present embodiment performs the error verification to the moving image stream included in the short time range and the error verification for the long time range including a plurality of short time ranges. That is, the video camera 100 performs a double-check for recording error on the moving image stream recorded on the optical disk 185. Thereby, the video camera 100 can more suitably verify whether the moving image stream is successfully recorded from the memory card 140 of the video camera 100 to the optical disk 185.

Further, the video camera 100 according to the present embodiment ranks the state of error included in the moving image stream with three levels (High, Middle, and Low) for verification. For such verification, by comparing the count of error packets included in a short time range with three threshold values (the threshold value (High), the threshold value (Middle), and the threshold value (Low)), the video camera 100 determines the degree of error in the moving image stream within the short time range (S203, S205, S207). Then, the video camera 100 ranks the degrees of error with three stages (High, Middle, and Low) to count the number of short time ranges including each degree of error (S204, S206, S208). Then, the video camera 100 determines whether the number of the short time ranges counted for each degree of error is the corresponding predetermined value or more respectively to perform the error verification to the moving image stream within the long time range (S210). In this manner, since the video camera 100 can set the error verifying accuracy for each degree of error, the video camera 100 can perform more preferable error verifying operation in comparison with the case in which the error verification is performed with one threshold value.

2-3. Specific Examples of Error Verifying Operation

Figure 5:
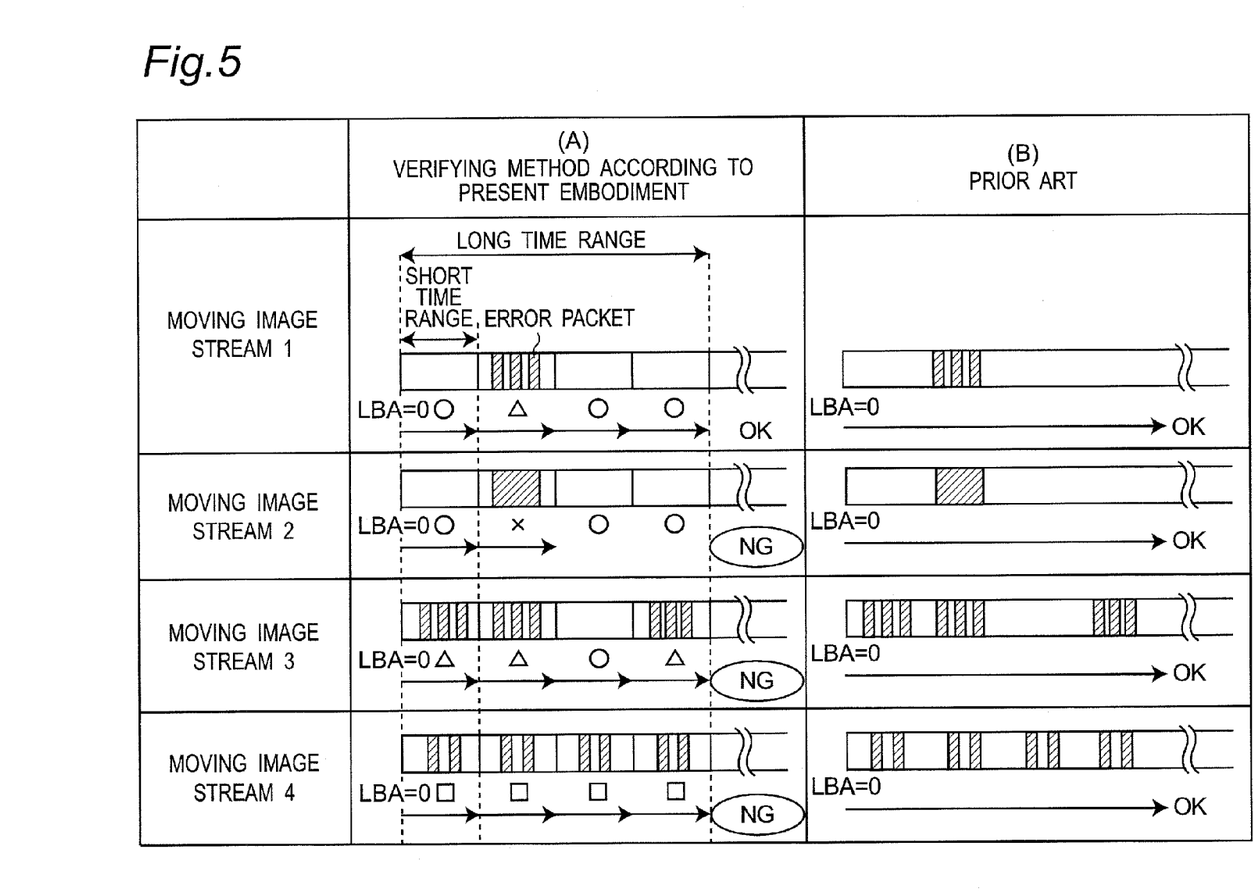
FIG. 5 is a diagram illustrating examples of the error verifying operation of the video camera according to the present embodiment.

Specific examples of the error verifying operation will be described with reference to FIG. 5. FIG. 5 is an image diagram illustrating examples of the error verifying operation of the video camera 100 in the present embodiment.

The column of FIG. 5 is a diagram illustrating specific examples of the cases where the verifying method according to the present embodiment is applied to moving image streams. The column (B) is a diagram illustrating specific examples of the cases where the verifying method according to the present embodiment is not applied to the moving image streams illustrated in the column (A).

In the examples illustrated in the column (A), as described above, the count of the error packets is checked within the short time range to detect the degree of error. Further, within the long time range, the determination is performed on whether the moving image stream is successfully recorded on the optical disk 185 (i.e., whether the recording has succeeded or failed) on the basis of the degree of error detected within the short time ranges.

FIG. 5 illustrates the moving image stream 1, the moving image stream 2, the moving image stream 3, and the moving image stream 4 as specific examples of the error packet state.

The moving image stream 1 is an example of data which has an area including error packets in the short time range but has the count of error packets which is small as a whole within the long time range, so that no noise is produced at reproduction. The moving image stream 2 is an example of data which has a fatal fault in a short time range and cannot be reproduced. The moving image stream 3 is an example of abnormal data which has many error packets in the long time range, producing a noise at reproduction. The moving image stream 4 is an example of abnormal data which has error packets in all the short time ranges composing the long time range, producing a noise at reproduction.

In FIG. 5, "LBA=0" indicates that the left end of the moving image stream is the head of the data. As described above, the moving image stream is divided by the short time range and the long time range. From the head of the data, the short time ranges are called the first, second, third, and fourth short time ranges in order. The long time range includes the first to fourth short time ranges.

In FIG. 5, the error determination result for the short time range by the controller 130 is marked with the symbols of "○ (good)", "□ (fault of low degree)", "Δ (fault of medium degree)", and "X (fatal)" for simplicity of description.

The symbol "○" indicates the determination that the count of the error packets detected within the short time range is equal to or less than the threshold value (Low) (NO in all of steps S203, S205, and S207).

The symbol "□" indicates the determination that the count of the detected error packets is greater than the threshold value (Low) (YES in step S207) and equal to or less than the threshold value (Middle) (NO in steps S203 and S205).

The symbol "Δ" indicates the determination that the count of the detected error packets is greater than the threshold value (Middle) (YES in step S205) and equal to or less than the threshold value (High) (YES in step S203).

The symbol "X" indicates the determination that the count of the detected error packets is greater than the threshold value (High) (YES in step S203).

When the long time range includes at least one short time range ("X") in which the count of error packets is greater than the threshold value (High) (YES in step S210), the controller 130 determines that the moving image stream is not successfully recorded on the optical disk 185 (recording has failed, NG) (S211).

When the long time range does not include any short time range ("X") in which the count of error packets is greater than the threshold value (High), but the count of the short time ranges ("Δ"), each having the count of error packets greater than the threshold value (Middle) and equal to or less than the threshold value (High), is equal to or greater than the predetermined value (three in the present embodiment) (YES in step S210), the controller 130 determines NG (recording has failed) (S211).

When the long time range does not include any short time range ("X") in which the count of error packets is greater than the threshold value (High), but the count of the short time ranges ("□"), each having the count of error packets greater than the threshold value (Low) and equal to or less than the threshold value (Middle), is equal to or greater than the predetermined value (four in the present embodiment) (YES in step S210), the controller 130 determines NG (recording has failed) (S211).

When the long time range does not include any short time range ("X") in which the count of error packets is greater the threshold value (High), and the count of the short time ranges ("Δ"), each having the count of error packets greater than the threshold value (Middle) and equal to or less than the threshold value (High), is less than the predetermined value (three), and further, the count of the short time ranges ("□"), each having the count of error packets greater than the threshold value (Low) and equal to or less than the threshold value (Middle), is less than the predetermined value (four) (NO in step S210), the controller 130 determines that the moving image stream is successfully recorded on the optical disk 185 (recording has succeeded, OK) (S215).

The error verifying method according to the present embodiment will be described below about the cases where the method is applied to the moving image streams 1 to 4.

The case of the moving image stream 1 will be described. It is determined by the controller 130 that the first short time range has no error packet ("○") (NO in all of steps S203, S205, and S207). It is determined that the second short time range has the count of error packets greater than the threshold value (Middle) and equal to or less than the threshold value (High) (hereinafter, referred to as "considerable number") ("Δ")(NO in step S203 and YES in step S205). It is determined that the third short time range and the fourth short time range have no error packet ("○") (NO in all of steps S203, S205, and S207). At this time, the three error level counts (High, Middle, and Low) are zero, one, and one, respectively. Hence, since the long time range includes the three error level counts (High, Middle, and Low), each of which is less than the corresponding predetermined values (one, three, and four in the present embodiment)(NO in step S210), the controller 130 determines that the recording has succeeded (OK) (S215).

The case of the moving image stream 2 will be described. It is determined by the controller 130 that the first short time range has no error packet ("○") (NO in all of steps S203, S205, and S207). It is determined that the second short time range has the error packets by the fatal number ("X") (YES in step S203). At this time, the error level count (High) is one. Hence, since the error level count (High) is at the predetermined value (YES in step S210), the controller 130 determines the recording as NG (recording has failed) (S211). If a certain short time range is determined as NG, the error verification will not be performed on the short time ranges subsequent to the short time range determined as NG.

The case of the moving image stream 3 will be described. It is determined by the controller 130 that the first short time range has a considerable number of error packets ("Δ"). It is determined that the second short time range also has a considerable number of error packets ("Δ"). It is determined that the third short time range has no error packet ("○"). It is determined that the fourth short time range has a considerable number of error packets ("Δ"). Hence, in this long time range, the error level counts (High, Middle, and Low) are zero, three, and three, respectively. At this time, since the error level count (Middle) is at the predetermined value (three) (YES in step S210), the controller 130 determines the recording as NG (recording has failed) (S211).

The case of the moving image stream 4 will be described. It is determined by the controller 130 that each of the first to fourth short time ranges has the count of error packets greater than the threshold value (Low) and equal to or less than the threshold value (Middle) ("□"). Hence, in this long time range, the error level count (Low) is four. At this time, since the error level count (Low) is at the predetermined value (four) (YES in step S210), the controller 130 determines the recording as NG (recording has failed) (S211).

As described above, with the verifying method according to the present embodiment, the moving image streams 2, 3, and 4 are determined as NG (recording has failed).

On the other hand, as illustrated in the column (B), the conventional video camera does not perform error check to the moving image stream and ignores the presence of error packet. Hence, the conventional video camera has recognized the moving image stream as OK (recording has succeeded). That is, the conventional video camera has recognized even data which cannot be reproduced or data which produces a noise under reproduction as successfully recorded data and does not inform the user that recording of the data has failed. As a result, the user thinks that the data has been successfully recorded to end of the copying operation of the data from the video camera to the optical disk.

In contrast, with the verifying method according to the present embodiment illustrated in the column and so on, data which cannot be reproduced or data which produces a noise under reproduction can be determined as NG (recording has failed). On the Basis of the determination, the video camera 100 can indicate to the user that the data has not been successfully recorded.

The controller 130 displays on the liquid crystal monitor 123 a message indicating that the recording has failed, and prompts the user to check the optical disk which has failed in recording. Thereby, the user can retry the copying operation by replacing the optical disk with a new optical disk without using the unsuccessfully recorded optical, disk or removing a stain (fingerprint, dust, or the like) from the surface of the unsuccessfully recorded optical disk.

As described above, the video camera 100 according to the present embodiment can detect, at the stage of copying (recording) the data to the recording medium, the moving image stream data which cannot be reproduced and/or the abnormal moving image stream data which produces a noise under reproduction, which is not noticed until the data is reproduced in the conventional art.

3. Conclusion of Present Embodiment

As described above, the video camera 100 according to the present embodiment includes the USB connector 161 operable to receive the moving image stream data recorded on the optical disk 185 and the controller 130 operable to verify the received data. The controller 130 sets a predetermined short time range and a long time range that includes a plurality of the short time ranges on the received moving image stream data, performs first verification about an error on moving image stream data included in the short time range out of the received moving image stream data, performs second verification about an error on moving image stream data included in the long time range out of the received moving image stream data on the basis of a result of the first verification, and determines whether the recorded moving image stream data is successfully recorded on the optical disk 185 on the basis of the results of the first and second verification.

The video camera 100 having the above configuration can verify whether the moving image stream data is successfully recorded on the optical disk 185 (That is, whether the moving image stream data can be reproduced and/or whether the moving image stream data produces a noise under reproduction).

Thereby, the video camera 100 can prevent a moving image which cannot be reproduced and/or which produces a noise under reproduction from being reproduced. In addition, since informing the user during the copying operation that the recording state of the optical disk is not good, the video camera 100 can prompt the user to retry the copying operation until the optical disk of good recording state can be created.

Further, when the controller 130 according to the present embodiment determines that the recorded moving image stream data is not successfully recorded on the optical disk 185 on the basis of the result of the second verification, even though determining that the recorded moving image stream data is successfully recorded on the optical disk 185 on the basis of the result of the first verification, the controller 130 determines that the recorded moving image stream data is not successfully recorded on the optical disk 185.

Thereby, the video camera 100 can detect an error in a degree of producing a noise under reproduction even if the degree of error included in each of the short time ranges is low.

Further, when the controller 130 according to the present embodiment determines that the recorded moving image stream data is not successfully recorded on the optical disk 185 on the basis of the result of the first verification, the controller 130 determines that the recorded moving image stream data is not successfully recorded on the optical disk 185 regardless of the result of the second verification.

Thereby, the controller 130 can determine that the recorded moving image stream data is not successfully recorded on the optical disk 185 without performing the second verification. Hence, the controller 130 can reduce the verification time in comparison with the case in which performing the second verification.

Further, the controller 130 according to the present embodiment ranks the state of error included in the received data with three levels (High, Middle, and Low). As the first verification, the controller 130 counts the error packets included in the short time range to verify whether the count of error packets for each level is greater than the threshold value (High, Middle, and Low) set for each level. As the second verification, the controller 130 verifies for each level whether the count of the short time ranges in the long time range, each of which has the count of error packets greater than the corresponding threshold value, is equal to or greater than the predetermined value set to each level on the basis of the result of the first verification. Then the controller 130 determines whether the recorded data is successfully recorded on the optical disk 185 on the basis of the result of the first and second verification at all levels.

Performing such two-staged error verification (double-check) for each level enables more preferable error verification.

Further, when the count of the short time ranges, each of which has the count of error packets greater than the corresponding threshold value in any one of the three levels, is equal to or greater than the corresponding predetermined value in the second verification, the controller 130 according to the present embodiment determines that the recorded data is not successfully recorded on the optical disk 185.

Thereby, if it cannot be determined that the data is not successfully recorded on the basis of the result of the first verification, it can be determined that the data is not successfully recorded on the basis of the result of the second verification. Hence, the controller 130 can perform more accurate error verification.

Further, in the error verification according to the present embodiment, the number of levels for distinguishing the error state is three (High, Middle, and Low).

With these levels, the error of high degree, the error of medium degree, and the error of low degree can be separately detected. This realizes the error detection which can change the accuracy of detection as a function of the degree of errors.

Further, the video camera 100 according to the present embodiment is operable to connect to the optical disk drive 180 that records received data to the optical disk 185. The video camera 100 includes the CCD image sensor 120 and the image processor 122 operable to generate the moving image stream data from a subject image, the USB connector 161 operable to transmit the generated moving image stream data to the optical disk drive 180 and to receive the moving image stream data recorded by the optical disk drive 180 on the optical disk 185, and the controller 130 operable to verify the received moving image stream data. The controller 130 sets a predetermined short time range and a long time range that includes a predetermined number of the short time ranges on the received moving image stream data, performs first verification about an error on moving image stream data included in the short time range out of the received moving image stream data, performs second verification about an error on moving image stream data included in the long time range out of the received moving image stream data on the basis of the first verification, and determines whether the recorded moving image stream data is successfully recorded on the optical disk 185 on the basis of the results of the first and second verification.

The video camera 100 having the above configuration can verify whether the moving image stream can be successfully recorded on the optical disk 185 immediately after the generated moving image stream is recorded on the external optical disk 185.

4. Other Embodiments

The idea of the above embodiment is not limited to the embodiment described above. Various embodiments may also be considered. Other embodiments to which the idea of the above embodiment can be applied will be described below.

Although the CCD image sensor 120 is used as an imaging element in the above embodiment, the idea of the above embodiment is not limited thereto. The idea of the above embodiment may be applied to, for example, a video camera in which a CCD image sensor or an NMOS image sensor is used as an imaging element.

In the above embodiment, three threshold values (the threshold value (High), the threshold value (Middle), and the threshold value (Low)) to be compared with the count of the error packets included in the short time range, the length of the short time range, and the length of the long time range are fixed values. However, the three threshold values, the length of the short time range, and/or the length of the long time range may be changed depending on the type of data recorded on the optical disk 185 (for example, the bit rate of the moving image stream). Alternatively, the three threshold values, the length of the short time range, and/or the length of the long time range may be changed as a function of the encoding/decoding capacity of the video camera 100. In these cases, the controller 130 detects the type of data and/or the encoding/decoding capability of the video camera 100 before performing the error verification. Changing the three threshold values, the length of the short time range, and/or the length of the long time range depending on the type of data and/or the encoding/decoding capability of the video camera 100 enables more suitable error verification.

In the above embodiment, copying of the moving image stream from the memory card 140 of the video camera 100 to the optical disk 185 of the optical disk drive 180 has been described. The verifying method according to the above embodiment may also be applied to the case in which, for example, the moving image stream is copied from the hard disk drive (HDD) of the video camera 100 to the optical disk 185 of the optical disk drive 180. Further, the verifying method according to the above embodiment may also be applied to the case in which, for example, the moving image stream is copied from the memory card 140 to the HDD inside the video camera 100. That is, the verifying method according to the above embodiment may be applied to any case in which the data is copied from a certain recording medium to other recording medium.

Further, in the above embodiment, the video camera 100 is connected to the optical disk drive 180 via the USB cable 200. However, the idea of the above embodiment is not limited thereto. The idea of the above embodiment may be applied to the case in which the video camera 100 is connected to the optical disk drive 180 via other means. For example, the video camera 100 may be connected to the optical disk drive 180 via a network.

Further, in the above embodiment, three threshold values are used for determining the degree of error included within the short time range. However, the idea of the above embodiment is not limited thereto. The idea of the above embodiment may also be applied to the case in which, for example, two or four threshold values are used.

Further, the threshold value may be one. In this case, the threshold value corresponds to the threshold value (Middle) in the above embodiment.

Further, in the above embodiment, an error verifying function is provided to the video camera 100. However, the idea of the above embodiment is not limited thereto. The error verifying function may be provided to a device other than the video camera. For example, the error verifying function may be provided to the optical disk drive 180. In this case, the controller 182 of the optical disk drive 180 includes a memory for receiving data recorded on the optical disk 185.

Further, in the above embodiment, the error verification is performed to the moving image stream. However, the idea of the above embodiment is not limited thereto. The error verification may be performed to data other than the moving image stream data. For example, the error verification may be performed to audio data.

Further, the video camera 100 according to the above embodiment reads out the data recorded on the optical disk 185 for each short time range in the error verifying operation. However, the idea of the above embodiment is not limited thereto. The video camera 100 may read out the data recorded on the optical disk 185 for each long time range or may read out all the data on the optical disk 185.

Further, in the above embodiment, the degree of error included within the short time range is indicated by the count of error packets. However, the idea of the above embodiment is not limited thereto. The degree of error may be indicated by a numerical value other than the count of error packets. For example, the degree of error may be indicated by the size of data which includes the error. In this case, the threshold value(s) for determining whether an error is included within the short time range is set as required.

The embodiments have been described above as examples of the art of the present disclosure. For this purpose, the detailed description and the attached drawings have been disclosed. Hence, some of the elements described in the detailed description and shown in the attached drawings may be unnecessary to solve the problem. Hence, the unnecessary element should not be instantly recognized as a necessary element merely because being described in the detailed description and shown in the attached drawings.

The above described embodiments exemplify the art of the present disclosure. Hence, The above described embodiments can be subject to various changes, substitutions, addition, omission and/or the like without departing from the scope of the claims and the their equivalent.

INDUSTRIAL APPLICABILITY

The idea of the disclosure may be applied to a device for performing verification of the recording to the recording medium (digital video camera, digital still camera, information terminal with a camera, disk drive, or the like) or the like.

What is claimed is:

1. A verifying device comprising:
   a receiving unit operable to receive data recorded on a recording medium; and
   a verifying unit operable to verify the received data, wherein
   the verifying unit
      sets a predetermined first range and a second range that includes a plurality of the first ranges on the received data,
      performs first verification about an error on data included in the first range out of the received data,
      performs second verification about an error on data included in the second range out of the received data on the basis of a result of the first verification, and
      determines whether the recorded data is successfully recorded on the recording medium on the basis of the results of the first and second verification.

2. The verifying device according to claim 1, wherein when the verifying unit determines that the recorded data is not successfully recorded on the recording medium on the basis of the result of the second verification even though determining that the recorded data is successfully recorded on the recording medium on the basis of the result of the first verification, the verifying unit determines that the recorded data is not successfully recorded on the recording medium.

3. The verifying device according to claim 1, wherein when the verifying unit determines that the recorded data is not successfully recorded on the recording medium on the basis of the result of the first verification, the verifying unit determines that the recorded data is not successfully recorded on the recording medium regardless of the result of the second verification.

4. The verifying device according to claim 1, wherein when the received data is stream data, the verifying unit changes a length of the first range and/or a length of the second range according to a bit rate of the received data.

5. The verifying device according to claim 1, wherein the verifying unit
   ranks a state of error included in the received data with a plurality of levels;
   as the first verification, counts the number of errors included in the first range and verifies for each of the levels whether the counted number of errors is greater than a threshold value set to each of the levels;
   as the second verification, verifies for each of the levels whether the number of the first ranges in the second range, each of which has the number of errors greater than the corresponding threshold value, is equal to or greater than a predetermined value set to each of the levels on the basis of the result of the first verification; and determines whether the recorded data is successfully recorded on the recording medium on the basis of the results of the first and second verification for all of the levels.

6. The verifying device according to claim 5, wherein when the number of the first ranges in the second range, each of which has the number of errors greater than the corresponding threshold value, is equal to or greater than the corresponding predetermined value in any one of the plurality of levels in the second verification, the verifying unit determines that the recorded data is not successfully recorded on the recording medium.

7. The verifying device according to claim 5, wherein the number of the levels is three.

8. The verifying device according to claim 5, wherein when the received data is stream data, the verifying unit changes a length of the first range, a length of the second range, and/or the plurality of threshold values according to the bit rate of the received data.

9. An imaging device operable to connect to a recording device that records received data on a recording medium, the imaging device comprising:
  an imaging unit operable to generate data from a subject image;
  a transmitting unit operable to transmit the generated data to the recording device so that the recording device records the generated data on the recording medium;
  a receiving unit operable to receive data recorded by the recording device on the recording medium; and
  a verifying unit operable to verify the received data, wherein
  the verifying unit
    sets a predetermined first range and a second range that includes a plurality of the first ranges on the received data,
    performs first verification about an error on data included in the first range out of the received data,
    performs second verification about an error on data included in the second range out of the received data on the basis of a result of the first verification, and
    determines whether the recorded data is successfully recorded on the recording medium on the basis of the results of the first and second verification.

10. A verifying method comprising:
receiving data recorded on a recording medium;
setting a predetermined first range and a second range that includes a plurality of the first ranges on the received data;
performing first verification about an error on data included in the first range out of the received data;
performing second verification about an error on data included in the second range out of the received data on the basis of the result of the first verification; and
determining whether the recorded data is successfully recorded on the recording medium on the basis of the results of the first and second verification.

* * * * *